United States Patent [19]
Skilliter, Jr.

[11] 4,239,278
[45] Dec. 16, 1980

[54] VEHICLE SUN VISOR

[75] Inventor: Robert T. Skilliter, Jr., Genoa, Ohio

[73] Assignee: The ACME Specialty Manufacturing Co., Toledo, Ohio

[21] Appl. No.: 6,888

[22] Filed: Jan. 26, 1979

Related U.S. Application Data

[63] Continuation-in-part of Ser. No. 776,259, Mar. 10, 1977, abandoned.

[51] Int. Cl.³ .................................................. B60J 3/00
[52] U.S. Cl. .................................................... 296/97 F
[58] Field of Search ................. 296/97 R, 97 C, 97 D, 296/97 G, 97 H, 97 F, 97 K

[56] References Cited
U.S. PATENT DOCUMENTS

| | | | |
|---|---|---|---|
| 2,076,397 | 4/1937 | Cady | 296/97 F |
| 2,160,504 | 5/1939 | Jacobs | 296/97 F |
| 3,351,375 | 11/1967 | Wheeler | 296/97 R |
| 3,378,297 | 4/1968 | Ternes et al. | 296/97 R |
| 3,383,132 | 5/1968 | Stamp | 296/97 R |
| 3,463,435 | 8/1969 | McGrew, Jr. | 296/97 R |
| 3,716,269 | 2/1973 | Herr et al. | 296/97 H |
| 3,870,403 | 3/1975 | Ward | 296/97 F |
| 4,058,340 | 11/1977 | Pinkas | 296/97 H |

*Primary Examiner*—Richard A. Bertsch
*Attorney, Agent, or Firm*—Emch, Schaffer, Schabu & Todd Co.

[57] ABSTRACT

A vehicle sun visor is disclosed which is molded from a resinous material having desired optical properties. The visor comprises a flat panel having an enlarged transparent peripheral bead of such dimension as to prevent the edges from acting as cutting edges. Encapsulated along one entire edge is a reinforcing rod, the ends of which may be formed to receive a means for mounting the sun visor.

6 Claims, 4 Drawing Figures

U.S. Patent     Dec. 16, 1980     4,239,278
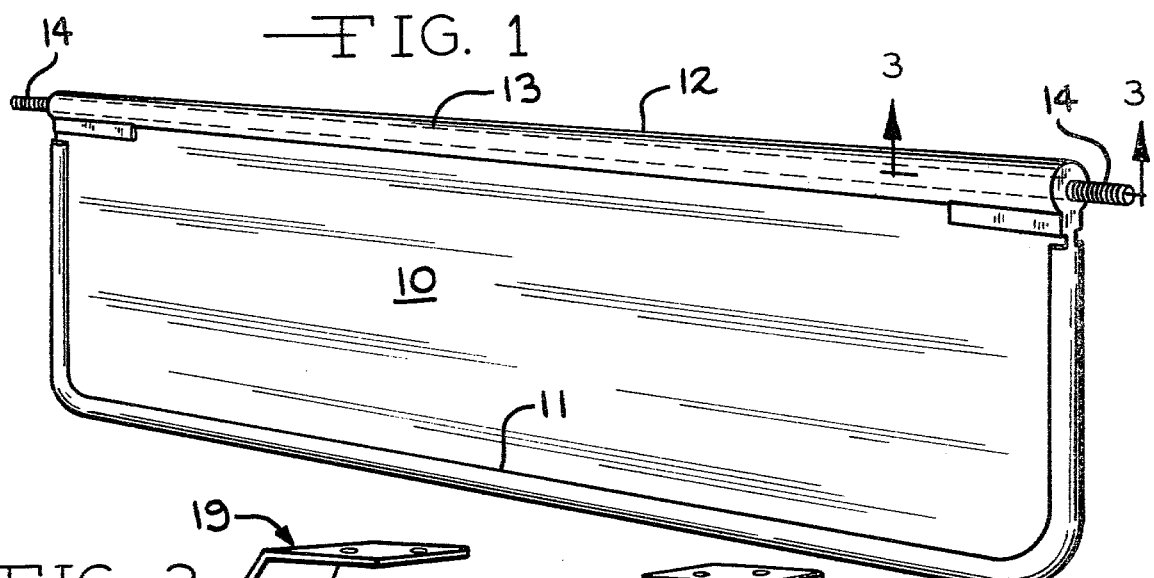
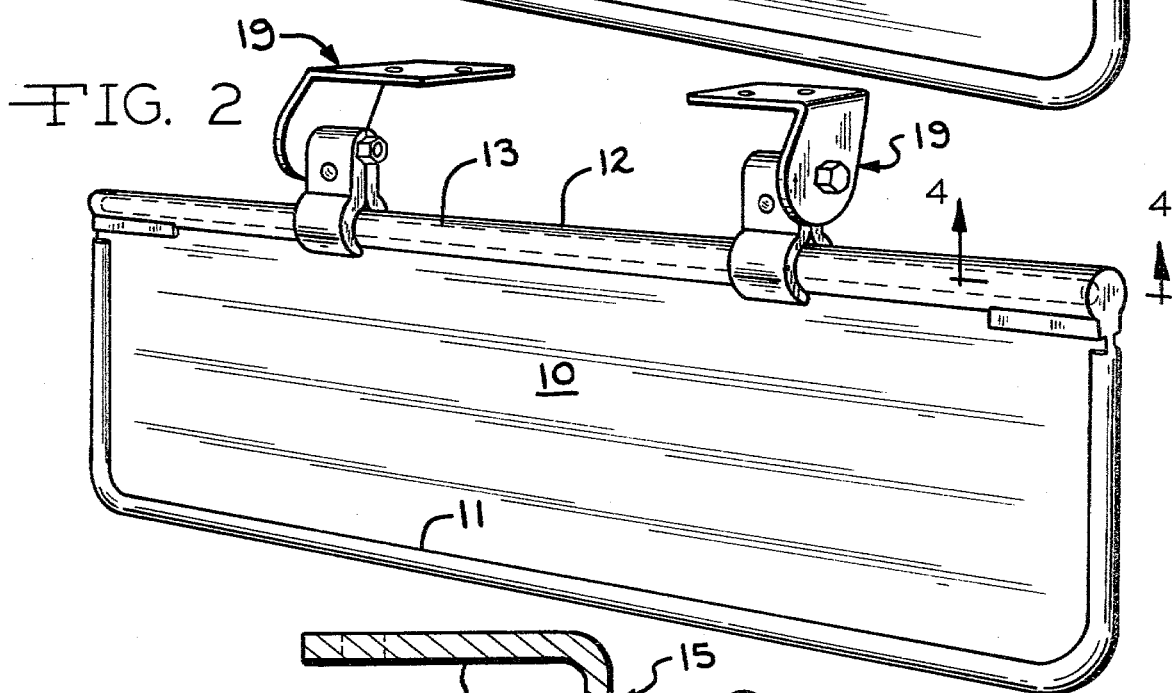
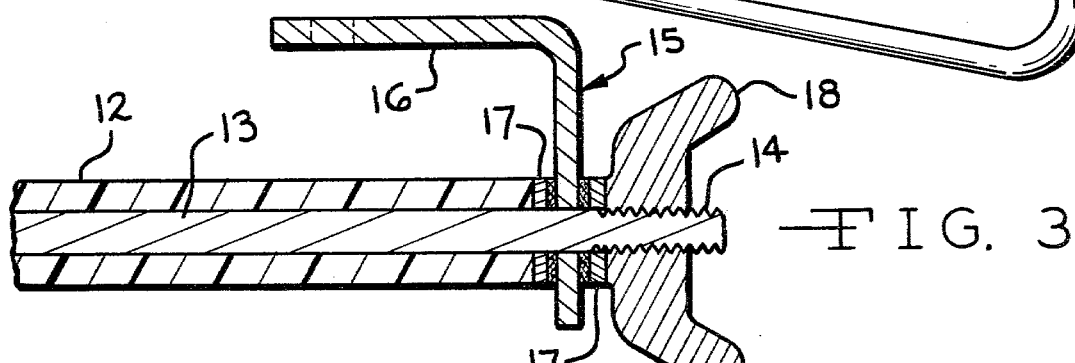
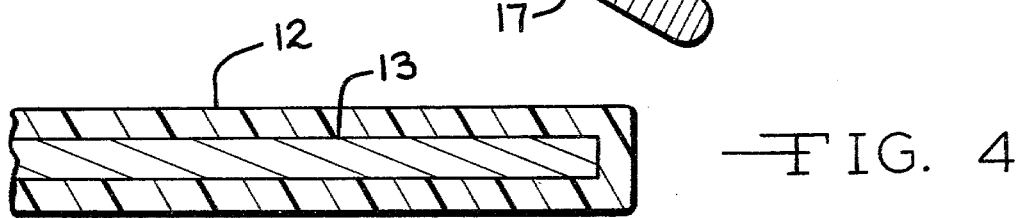

VEHICLE SUN VISOR

This application is a continuation-in-part of my application, Ser. No. 776,259, filed Mar. 10, 1977, now abandoned.

BACKGROUND OF THE INVENTION

It has heretofore been the practice to manufacture tinted transparent or translucent sun visors for automotive vehicles by casting or extruding a sheet of properly tinted acrylic resin and forming from the sheet a visor of selected configuration. The material of the visor has been of uniform thickness. The thickness has rarely exceeded an eigth of an inch so that the edge of the visor was often relatively sharp and dangerous if it were struck by the head of a driver thrown forward during an accident.

It is known in the art that a padded edge may be made by covering the sharp edges of the visor with a strip of rubber or other resilient material. However, this construction has been objected to because it results in a line of opaque material extending across the driver's field of vision usually in the area where visibility is most important.

The present invention discloses a molded sun visor having an enlarged transparent bead extending along the entire periphery of the sun visor. The material of the sun visor is homogeneous throughout and the exposed edges are blunted and, therefore, safer in case of an accident.

One prior art practice was to reinforce the resinous sheet of tinted transparent material through the use of metal frames. This construction also results in lines of opaque material extending across the driver's field of vision, thereby increasing the hazards presented by blind-spots in the oncoming traffic pattern.

The present invention discloses a transparent sun visor reinforced along a single edge by a reinforcing rod encapsulated integrally within the edge. The reinforcing rod extends across the edge of the sun visor found to be closest in proximity to the roof of the vehicle in which the sun visor is mounted. As a result, the sun visor discloses the optimum in transparency while providing a sturdy panel with the exposed edges being blunted so as to reduce the hazards presented to the driver in case of an accident.

BRIEF DESCRIPTION OF THE DRAWINGS

In the drawings, FIG. 1 is a perspective view of a sun visor in accordance with the present invention, with the ends of the reinforcing rod extending beyond the adjacent edges of the sun visor;

FIG. 2 is a perspective view of a sun visor in accordance with the present invention, with the ends of the reinforcing rod not extending beyond the edges and showing one type of mounting means;

FIG. 3 is an enlarged section on line 3—3 of FIG. 1, having a different mounting means positioned on the end of the sun visor; and FIG. 4 is an enlarged section on line 4—4 of FIG. 2.

The sun visor of the present invention includes a flat central portion 10 surrounded by a bead 11 that is generally of circular cross section. The visor is formed by molding under high pressure a mass of resinous material, such as an acrylic resin or prefereably a polyester having the desired degree of tint or opacity. The bead 11 has a radius large enough to prevent it from acting as a cutting edge in the event that the driver's head should be thrown into it during an accident. In a preferred execution of the invention the planar portion of the visor is about 0.150 of an inch thick and the bead 11 thickness is about 0.31 of an inch. These dimensions may vary at the selection of the designer for differing applications.

By molding the panel 10 and bead 11 from the same tinted transparent material the objection of known visors having an opaque edge guard is eliminated. The bead 11 does not interfere seriously with the visibility of the vehicle operator.

Encapsulated across the entire upper edge of the visor is a rod 13 capable of providing structural reinforcement. In a preferred execution of the invention, the reinforcing rod 13 is about 0.222 of an inch in diameter and about 0.450 of an inch in diameter when encapsulated. These dimensions may vary at the selection of the designer for differing applications.

It has been found that a polyester, specifically a "Kodar" PETE copolyester 6763 material, produced by Eastman Chemical Products, Inc. molded to encapsulate a machinable steel rod provides unexpected advantages in structural integrity. No fragmenting results in the molded rod-panel assembly as is often true in molded or cast assemblies which include plastic and metal interfaces.

In the FIG. 1 embodiment, threaded ends 14 of the reinforcing rod 13 extend beyond the adjacent edges of the visor. The extended ends 14 of the reinforcing rod 13 engage mounting brackets 15 fixed to a vehicle as shown in FIG. 3. The bracket 15 includes a mounting arm 16 which is positioned between washers 17 and retained on the end 14 by a wing nut 18.

In some instances the mounting means for the sun visor involves encapsulating the reinforcing rod 13 in such a manner that the ends of the rod 13 are adjacent the sides of the sun visor as shown in FIG. 2. Mounting brackets 19 grip the bosses 12 and are fixed to a vehicle. The brackets 19 allow the sun visor to pivot relative to the vehicle.

From the foregoing it will be seen that the present invention provides a molded sun visor of an opaque, transparent, or translucent body having an integral peripheral bead of similar light transmission properties and of such dimension that the hazard presented by the sharp edge of a visor formed from flat stock is virtually eliminated. The present invention further provides a means of reinforcement and visual safety while eliminating the usual obstructions found in the driver's field of vision. The result is an improved sun visor, in the areas of reinforcement, visual safety and physical safety.

What I claim is:

1. A vehicle sun visor having a top edge, opposed side edges and a lower edge, said visor to be interposed between the vehicle operator and a light source, comprising a tinted transparent flat panel molded from a resinous material, said panel having an enlarged and substantially transparent bead of the same material formed integrally therewith, said bead extending substantially along the entire periphery of said panel said enlarged bead extending across the entire lower edge preventing said lower edge from acting as a cutting edge, a rod encapsulated integrally within the bead along said top edge of said panel to reinforce said panel, said rod extending from a point adjacent one side edge to a point adjacent said opposed side edge, whereby said encapsulated rod gives structural strength across the entire top edge of said panel, and means for mounting said sun visor to a vehicle.

2. A sun visor in accordance with claim 1, wherein said molded material is a tinted transparent material, whereby said portion of said bead extending from said edge of said panel containing said reinforcing rod is transparent and does not block the visibility of the vehicle operator.

3. A sun visor in accordance with claim 2, wherein said molded material comprises a polyester resin and said reinforcing rod is steel.

4. A sun visor in accordance with claim 1, whereby said portion of said bead extending from said edge of said panel containing said reinforcing rod is of substantially large dimension and prevents said edge of said sun visor from acting as a cutting edge.

5. A sun visor in accordance with claim 1, wherein said bead contains a boss formed of said resinous material said boss being integrally molded and terminating adjacent the ends of said reinforcing rod, said means for mounting comprising a bracket which grips said bead.

6. A sun visor in accordance with claim 1, wherein said rod has opposed ends extending beyond the ends of said bead to receive said mounting means.

* * * * *